(12) United States Patent
Chen et al.

(10) Patent No.: US 12,487,680 B2
(45) Date of Patent: Dec. 2, 2025

(54) HAPTIC FEEDBACK PANEL, HAPTIC FEEDBACK METHOD THEREFOR, AND HAPTIC FEEDBACK DEVICE THEREFOR

(71) Applicants: Beijing BOE Technology Development Co., Ltd., Beijing (CN); BOE Technology Group Co., Ltd., Beijing (CN)

(72) Inventors: Yuju Chen, Beijing (CN); Xiaotong Liu, Beijing (CN); Zhiming Yang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/691,406

(22) PCT Filed: Nov. 29, 2021

(86) PCT No.: PCT/CN2021/133907
§ 371 (c)(1),
(2) Date: Mar. 12, 2024

(87) PCT Pub. No.: WO2023/092540
PCT Pub. Date: Jun. 1, 2023

(65) Prior Publication Data
US 2024/0377890 A1    Nov. 14, 2024

(51) Int. Cl.
*G06F 3/041* (2006.01)
*G06F 3/01* (2006.01)

(52) U.S. Cl.
CPC .............. *G06F 3/016* (2013.01); *G06F 3/041* (2013.01); *G06F 2203/04107* (2013.01)

(58) Field of Classification Search
CPC ................. G06F 3/016; G06F 3/041; G06F 2203/04107; G06F 3/01
See application file for complete search history.

(56) References Cited

U.S. PATENT DOCUMENTS

2008/0290759 A1* 11/2008 Kaida .................. H03H 9/562
                                                29/25.35
2021/0373694 A1* 12/2021 Yeom .................... G06F 3/0412

FOREIGN PATENT DOCUMENTS

| CN | 106537301 A | 3/2017 |
| CN | 207516968 U | 6/2018 |
| CN | 111506187 A | 8/2020 |
| CN | 112799501 A | 5/2021 |

OTHER PUBLICATIONS

PCT/CN2021/133907 international search report dated Jul. 27, 2022.

* cited by examiner

*Primary Examiner* — Temesghen Ghebretinsae
*Assistant Examiner* — Sosina Abebe
(74) *Attorney, Agent, or Firm* — IPro, PLLC (57) ABSTRACT

A tactile feedback panel, a tactile feedback method therefor, and a tactile feedback device. The tactile feedback panel includes: a touch substrate; and at least one piezoelectric device located on one side of the touch substrate, wherein the piezoelectric device is configured to vibrate under the effect of an alternating electric field having different resonant frequencies, and to drive the touch substrate to vibrate and generate a vibration sound.

14 Claims, 6 Drawing Sheets

HAPTIC FEEDBACK PANEL, HAPTIC FEEDBACK METHOD THEREFOR, AND HAPTIC FEEDBACK DEVICE THEREFOR

CROSS-REFERENCE TO RELATED APPLICATIONS

This application is a National Stage of International Application No. PCT/CN2021/133907, filed Nov. 29, 2021, which is hereby incorporated by reference in its entirety.

TECHNICAL FIELD

The present disclosure relates to the technical field of tactile interaction, and in particular to a haptic feedback panel, a haptic feedback method therefor, and a haptic feedback device.

BACKGROUND

Haptic feedback is one of important ways of human-computer interaction. Compared with the mature audio-visual interaction technology, haptic feedback is in a rapid development stage. In particular, the haptic feedback enables texture reproduction of materials, shapes, etc., as well as vibration haptic feedback. A terminal integrates haptic feedback, which can provide authenticity and immersion of human-computer interaction.

SUMMARY

Embodiments of the invention provide a haptic feedback panel, a haptic feedback method therefor and a haptic feedback device, and specific schemes are as follows.

Embodiments of the present disclosure provide a haptic feedback panel, including:

a touch substrate; and at least one piezoelectric device on a side of the touch substrate, the piezoelectric device being configured to vibrate under action of alternating electric fields with different resonant frequencies, and drive the touch substrate to vibrate and emit a vibration sound.

In a possible implementation, in the above haptic feedback panel according to embodiments of the present disclosure, the piezoelectric device includes a first electrode, a piezoelectric layer and a second electrode sequentially stacked; the first electrode is close to the touch substrate, the first electrode is grounded, and the second electrode is electrically connected with an input end of a driving voltage; the first electrode and the second electrode are configured to form the alternating electric fields, and the piezoelectric layer is configured to vibrate under the action of the alternating electric fields, and drive the touch substrate to vibrate and emit the vibration sound.

In a possible implementation, in the above haptic feedback panel according to embodiments of the present disclosure, the driving voltage for driving the touch substrate to emit the vibration sound of a periodic vibration sense satisfies a following relationship:

$$Y = (\sin(2*\pi*0.5*t))*(0.5 - 0.5*\cos(2*\pi*fe*t))*\sin(2*\pi*fc*t);$$

hereinbefore, Y is the driving voltage, fc is a carrier frequency, fe is an envelope frequency, and t is vibration time.

In a possible implementation, in the above haptic feedback panel according to embodiments of the present disclosure, the driving voltage input by the input end of the driving voltage for driving the touch substrate to emit the vibration sound of a tapping vibration sense satisfies a following relationship:

$$Y = \exp(-1*\beta*t)*\sin(2*\pi*fc*t);$$

hereinbefore, Y is the driving voltage, B is an inverse attenuation coefficient, fc is a carrier frequency, and t is vibration time.

In a possible implementation, in the above haptic feedback panel according to embodiments of the present disclosure, fc is 500 Hz to 800 Hz.

In a possible implementation, in the above haptic feedback panel according to embodiments of the present disclosure, an emitting azimuth angle of a sound source emitting the vibration sound is greater than 60°.

In a possible implementation, in the above haptic feedback panel according to embodiments of the present disclosure, the at least one piezoelectric device includes a plurality of piezoelectric devices, and a row of the piezoelectric devices are arranged on any two opposite sides of the touch substrate.

In a possible implementation, in the above haptic feedback panel according to embodiments of the present disclosure, the piezoelectric devices are arranged in series or in parallel.

In a possible implementation, in the above haptic feedback panel according to embodiments of the present disclosure, a gap between adjacent piezoelectric devices is less than 1 mm, and a thickness of the piezoelectric device is less than a thickness of the touch substrate.

In a possible implementation, in the above haptic feedback panel according to embodiments of the present disclosure, further including an anti-explosion film layer on a side of the touch substrate away from the piezoelectric device, transmittance of the anti-explosion film layer is greater than 90%.

In a possible implementation, in the above haptic feedback panel according to embodiments of the present disclosure, a thickness of the piezoelectric layer is 500 nm to 2000 nm.

In a possible implementation, in the above haptic feedback panel according to embodiments of the present disclosure, the piezoelectric layer includes at least one of lead zirconate titanate, aluminum nitride, zinc oxide, barium titanate, lead titanate, potassium niobate, lithium niobate, lithium tantalate, or langasite.

Correspondingly, embodiments of the present disclosure further provide a haptic feedback device, including the haptic feedback panel as described in any one of the above items, and a display substrate on a side of the piezoelectric device in the haptic feedback panel away from the touch substrate.

In a possible implementation, in the above haptic feedback device according to embodiments of the present disclosure, the display substrate includes a display region and a peripheral region at a periphery of the display region, and an orthographic projection of the piezoelectric device on the display substrate is located in the peripheral region.

In a possible implementation, in the above haptic feedback device according to embodiments of the present disclosure, further including a foam layer between the piezoelectric device and the display substrate, a width of the foam layer is less than a width of the piezoelectric device.

In a possible implementation, in the above haptic feedback device according to embodiments of the present disclosure, further including a housing layer for fixing the haptic feedback panel and the display substrate, the housing layer includes a first shielding part fixed on a side of the haptic feedback panel away from the display substrate, and a second shielding part fixed on a side surface of the haptic feedback panel and a side surface of the display substrate; the first shielding part and the second shielding part are of an integral structure;

the orthographic projection of the piezoelectric device on the display substrate is located within a range of an orthographic projection of the first shielding part on the display substrate, and an orthographic projection of the foam layer on the display substrate is located within a range of the orthographic projection of the piezoelectric device on the display substrate.

Correspondingly, embodiments of that present disclosure further provide a haptic feedback method for driving the haptic feedback panel as described in any one of the above items, including:

applying alternating electric fields with different resonant frequencies to the piezoelectric device, the piezoelectric device vibrates under action of the alternating electric fields, and drives the touch substrate to vibrate and emit a vibration sound.

In a possible implementation, in the above haptic feedback method according to embodiments of the present disclosure, a ground signal is applied to a first electrode of the piezoelectric device, a driving voltage for driving the touch substrate to emit the vibration sound of a periodic vibration sense is applied to a second electrode of the piezoelectric device, and the driving voltage satisfies a following relationship:

$$Y = (\sin(2*\pi*0.5*t))*(0.5 - 0.5*\cos(2*\pi*fe*t))*\sin(2*\pi*fc*t);$$

hereinbefore, Y is the driving voltage, fc is a carrier frequency, fe is an envelope frequency, and t is vibration time.

In a possible implementation, in the above haptic feedback method according to embodiments of the present disclosure, a ground signal is applied to a first electrode of the piezoelectric device, a driving voltage for driving the touch substrate to emit the vibration sound of a tapping vibration is applied to a second electrode of the piezoelectric device, and the driving voltage satisfies a following relationship:

$$Y = \exp(-1*\beta*t)*\sin(2*\pi*fc*t);$$

hereinbefore, Y is the driving voltage, B is an inverse attenuation coefficient, fc is a carrier frequency, and t is vibration time.

DETAILED DESCRIPTION

In order to make the purpose, technical solutions and advantages of embodiments of the present disclosure more clear, the technical solutions of embodiments of the present disclosure will be clearly and completely described below in conjunction with the drawings of embodiments of the present disclosure. Obviously, the described embodiments are some, but not all, of embodiments of the present disclosure. In addition, embodiments and features in the embodiments of the present disclosure may be combined with each other without conflict. Based on the described embodiments of the present disclosure, all other embodiments obtained by those of ordinary skill in the art without creative efforts fall within the scope of protection of the present disclosure.

Unless otherwise defined, technical or scientific terms used here shall have their ordinary meaning understood by a person of ordinary skill in the art to which this disclosure belongs. Words such as "include" or "comprise" mean that the elements or things appearing before the word include the elements or things listed after the word and their equivalents, without excluding other elements or things. Words such as "connection" or "connected" are not limited to physical or mechanical connections, but may include electrical connections, whether direct or indirect. "Inner", "outer", "up", "down", etc., are only used to express relative positional relationships. When the absolute position of the described object changes, the relative positional relationship may also change accordingly.

It should be noted that the size and shape of each figure in the drawings do not reflect the true scale, but are only intended to illustrate the present disclosure. In addition, the same or similar reference numerals represent the same or similar elements or elements having the same or similar functions throughout.

Figure 1:
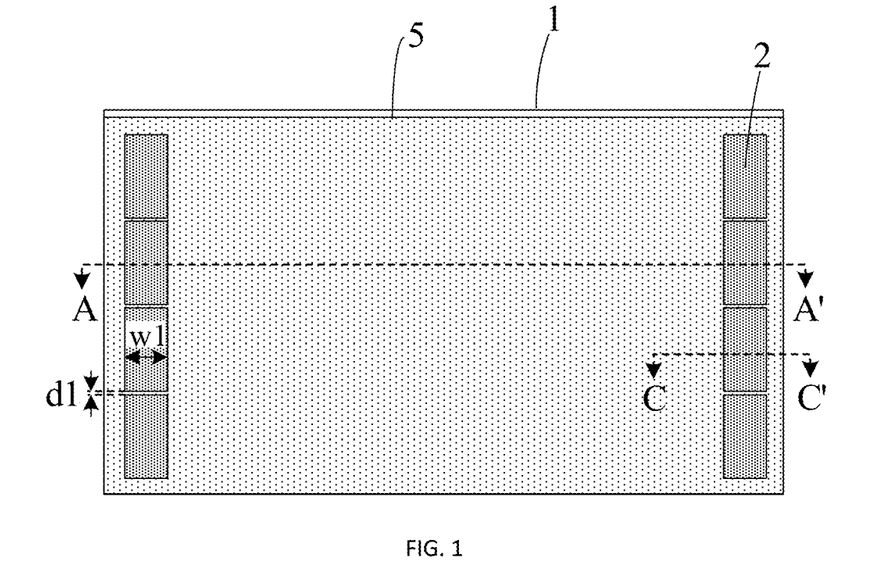
FIG. 1 is a schematic plan view of a haptic feedback panel according to an embodiment of the present disclosure.
Figure 2:
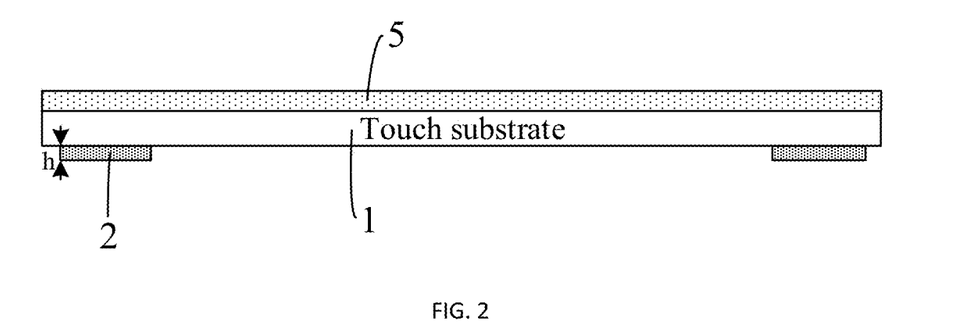
FIG. 2 is a cross-sectional view taken along a direction AA' in FIG. 1.
Figure 3:
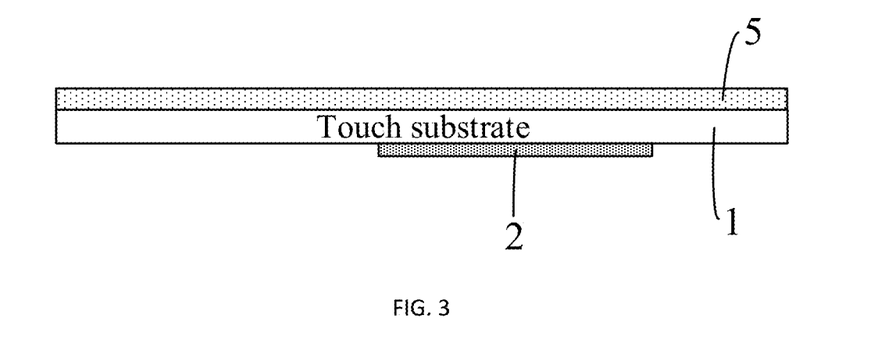
FIG. 3 is a cross-sectional view along a direction CC' in FIG. 1.

Thin film piezoelectric materials have characteristics of high dielectric constant and transparency, and are very suitable for a screen integrated vibrator structure. The haptic feedback function of the electronic device may be implemented using a vibrator structure. In order to realize haptic feedback and screen sound simultaneously, to improve the authenticity and immersion of human-computer interaction, an embodiment of the present disclosure provides a haptic feedback panel, as shown in FIG. 1 to FIG. 3. FIG. 1 is a schematic plan view of a haptic feedback panel, FIG. 2 is a cross-sectional view along a direction AA' in FIG. 1, and FIG. 3 is a cross-sectional view along a direction CC' in FIG. 1. The haptic feedback panel includes:

a touch substrate 1; and
at least one piezoelectric device 2 on a side of the touch substrate 1, the piezoelectric device 2 being configured to vibrate under action of alternating electric fields with different resonant frequencies, and drive the touch substrate 1 to vibrate and emit a vibration sound.

The haptic feedback panel according to embodiments of the present disclosure can use the piezoelectric device 2 to achieve haptic feedback function and sound emitting function of the haptic feedback panel. Then integrated visual, tactile and auditory module design of virtual touch and screen sound can be achieved further using the screen display of the touch substrate 1. Virtual touch can be realize on the touch substrate 1 and a corresponding sound prompt can be generated based on tactile perception, enhancing the authenticity and immersion of human-computer interaction.

Specifically, when the piezoelectric device made of a thin film piezoelectric material is connected with an alternating current (AC) signal, a vibration can be generated. The signal with a lower frequency (0 to 300 Hz) can produce a tactile vibration, and the signal with a higher frequency (300 Hz to 20000 Hz) can produce an audio vibration. The frequency of the AC signal corresponding to the most auditory sensitive position of the human body is 1000 Hz to 3000 Hz, and the audio here is similar to the soprano range, which makes people feel uncomfortable. The frequency of the AC signal corresponding to the most tactile sensitive position of the human body is 150 Hz to 200 Hz. To design a device that prompts a user and generates corresponding auditory and tactile response signals simultaneously, the frequency design range of the AC signal corresponding to audio and tactile sensation shall be within a range of 500 Hz to 800 Hz. Therefore, for the haptic feedback panel according to embodiments of the present disclosure, a range of a carrier frequency fc of the AC signal corresponding to the haptic feedback and the screen sound is within 500 Hz to 800 Hz.

In a specific implementation, the touch substrate 1 may include a base substrate and a touch electrode layer on the base substrate. The base substrate may be a glass substrate, and a material of the touch electrode layer may be a transparent conductive material such as ITO or IZO, etc. A thickness of the touch substrate 1 is less than 1.5 mm.

Figure 4:
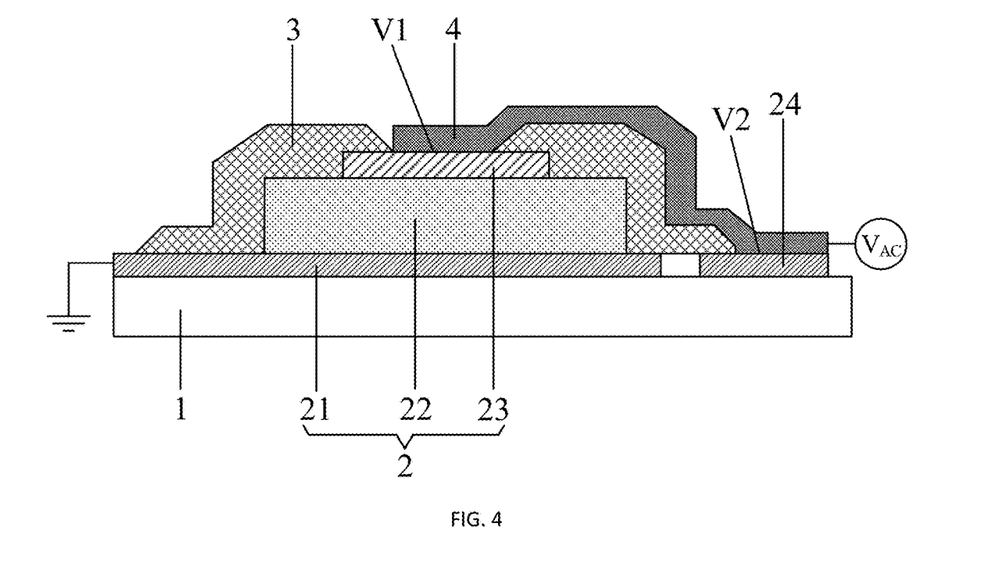
FIG. 4 is a schematic structural diagram of a piezoelectric device according to an embodiment of the present disclosure.

In a specific implementation, in the above haptic feedback panel according to embodiments of the present disclosure, as shown in FIG. 4, the piezoelectric device 2 includes a first electrode 21, a piezoelectric layer 22 and a second electrode 23 sequentially stacked. The first electrode 21 is close to the touch substrate 1, the first electrode 21 is grounded, and the second electrode 23 is electrically connected with an input end of a driving voltage.

The first electrode 21 and the second electrode 23 are configured to form the alternating electric fields, and the piezoelectric layer 22 is configured to vibrate under the action of the alternating electric fields, and drive the touch substrate 1 to vibrate and emit the vibration sound.

In a specific implementation, in the above haptic feedback panel according to embodiments of the present disclosure, as shown in FIG. 4, the haptic feedback panel may further include a bonding electrode 24 on a same layer as the first electrode 21. The bonding electrode 24 is arranged close to an edge of the touch substrate 1, and the bonding electrode 24 is configured to connect the input end of the driving voltage. A voltage signal input by the input end of the driving voltage is an AC voltage signal. The haptic feedback panel may further include an insulating layer 3 and a wiring layer on a side of the second electrode 23 away from the touch substrate 1. The wiring layer includes a wiring 4, one end of the wiring 4 is electrically connected with the second electrode 23 through a first via hole V1 in the insulating layer 3, and the other end of the wiring 4 is electrically connected with the bonding electrode 24 through a second via hole V2 in the insulating layer 3. In a specific implementation, a ground voltage signal is input to the first electrode 21 through an input end of a ground voltage, an AC voltage signal is applied to the second electrode 23 through an input end of a driving voltage, and an alternating electric field may thus be formed between the first electrode 21 and the second electrode 23. A frequency of the alternating electric field is identical with a frequency of the AC voltage signal. Under action of the alternating electric field, the piezoelectric layer 22 is deformed and generates a vibration signal, and drives the touch substrate 1 to vibrate and emit a vibration sound.

In this embodiment, the first electrode 21 and the bonding electrode 24 may be made of the same material and formed by a patterning process.

In a specific implementation, in the above haptic feedback panel according to embodiments of the present disclosure, as shown in FIG. 1 and FIG. 2, the piezoelectric device 2 may be designed using a piezoelectric ceramic or a piezoelectric film, a thickness of the piezoelectric device 2 is less than 1000 μm, a d33 characteristic of the piezoelectric device 2 is greater than 50 pC/N, and the piezoelectric device 2 is disposed at an edge of the touch substrate 1.

In a specific implementation, in order to avoid cracking of a surface of the touch substrate and to provide an initial frictional force, the above haptic feedback panel according to embodiments of the present disclosure further includes an anti-explosion film layer 5 on a side of the touch substrate 1 away from the piezoelectric device 2, and transmittance of the anti-explosion film layer 5 is greater than 90%. Specifically, a material of the anti-explosion film layer 5 may be a polyethylene terephthalate (PET) material or an acrylic material. A thickness of the anti-explosion film layer 5 may be more than 30 μm, and a friction coefficient between the anti-explosion film layer 5 and a user's finger is 0.4 to 0.7.

In a specific implementation, in the above haptic feedback panel according to embodiments of the present disclosure, as shown in FIG. 1 and FIG. 2, a width w1 of the piezoelectric device 2 may be about 10 mm, a thickness h of the piezoelectric device 2 may be about 20 mm, and a distance d between the piezoelectric device 2 and an edge of the touch substrate 1 is less than 5 mm. Of course, d is affected by the patch process and the housing design, and can be designed according to requirements.

In a specific implementation, in the above haptic feedback panel according to embodiments of the present disclosure, as shown in FIG. 1 and FIG. 2, a gap d1 between adjacent piezoelectric devices 2 in the same column is less than 1 mm, and a thickness h of the piezoelectric device 2 is less than a thickness of the touch substrate 1.

In a specific implementation, in the above haptic feedback panel according to embodiments of the present disclosure, as shown in FIG. 1, a plurality of piezoelectric devices 2 are included, and a row of the piezoelectric devices 2 are arranged on any two opposite sides of the touch substrate 1. Of course, a row of piezoelectric devices 2 can also be arranged on each side of the touch substrate 1, and the design can be carried out according to touch requirements.

Figures 5A, 5B:
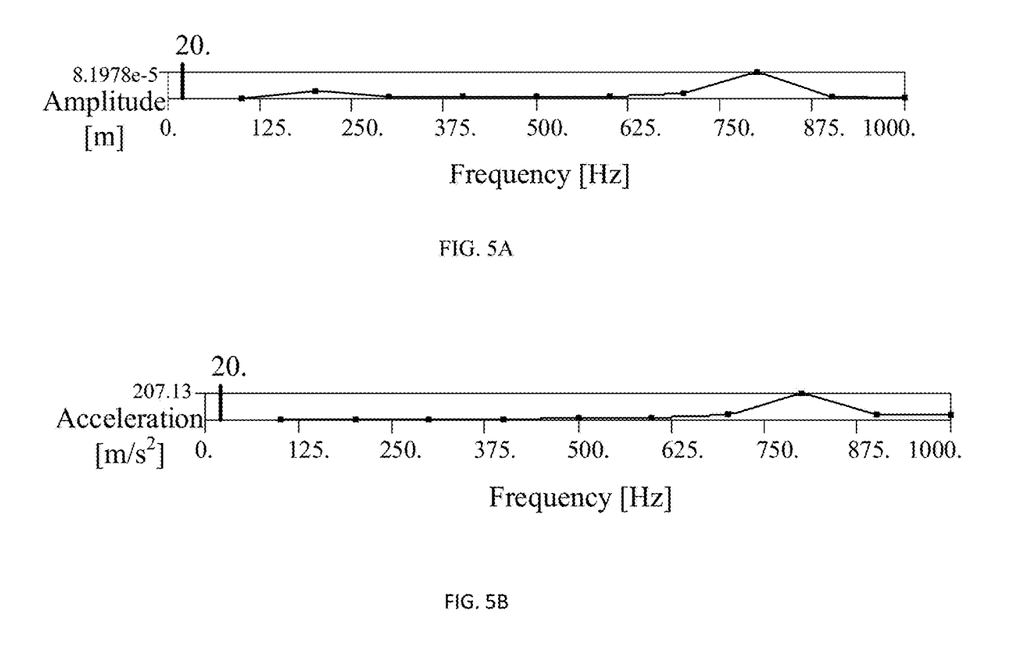
FIG. 5A is a schematic diagram of amplitudes generated when a piezoelectric device vibrates under action of alternating electric fields with different frequencies.
FIG. 5B is a schematic diagram of accelerations generated when a piezoelectric device vibrates under action of alternating electric fields with different frequencies.

In a specific implementation, in the above haptic feedback panel according to embodiments of the present disclosure, as shown in FIG. 1, the piezoelectric devices 2 may be arranged in series or in parallel. Phases of driving voltage signals correspondingly input for left and right columns of piezoelectric devices 2 in FIG. 1 are identical, and the piezoelectric device 2 is required to vibrate with amplitude of more than 1 μm and an acceleration of more than 1 G (9.8 m/s$^2$). As shown in FIG. 5A and FIG. 5B, FIG. 5A is a schematic diagram of amplitudes generated when the piezoelectric device 2 vibrates under action of alternating electric fields with different frequencies, FIG. 5B is a schematic diagram of accelerations generated when the piezoelectric device 2 vibrates under action of alternating electric fields with different frequencies. As can be seen, the piezoelectric device 2 vibrates significantly at 800 Hz.

Figure 6A:
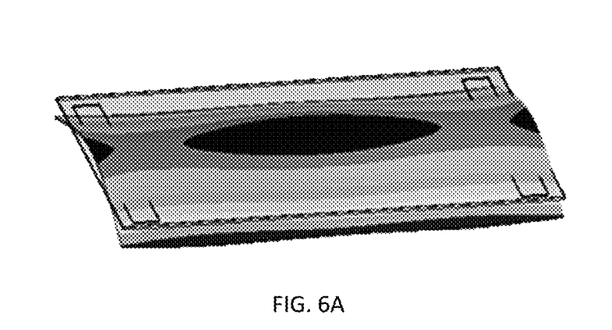
FIG. 6A is a schematic simulation diagram of a vibration of a piezoelectric device at a low frequency (<1000 Hz).
Figure 6B:
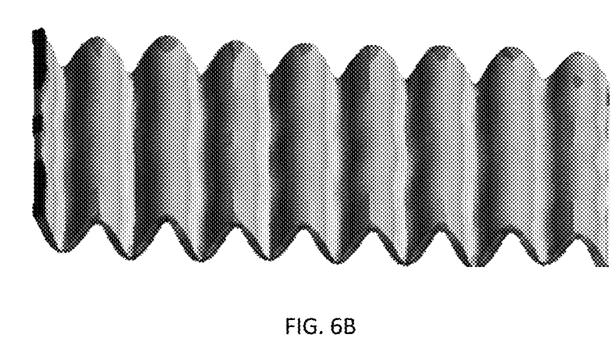
FIG. 6B is a schematic simulation diagram of a vibration with a standing wave presented when a piezoelectric device vibrates at a high frequency (>20 kHz).

In a specific implementation, when the piezoelectric device vibrates, the vibration must satisfy two characteristics. As shown in FIG. 6A, FIG. 6A is a schematic simulation diagram of a vibration at a low frequency (<1000 Hz), the vibration is not limited to a specific vibration profile, and the vibration and screen sound can be realized simultaneously. As shown in FIG. 6B, FIG. 6B is a s schematic simulation diagram of a vibration with a standing wave at a high frequency (>20 kHz), a half wavelength of the standing wave needs to be less than 15 mm, and wavefront of the standing wave needs to be parallel to a short side of the touch substrate.

Figure 7A:
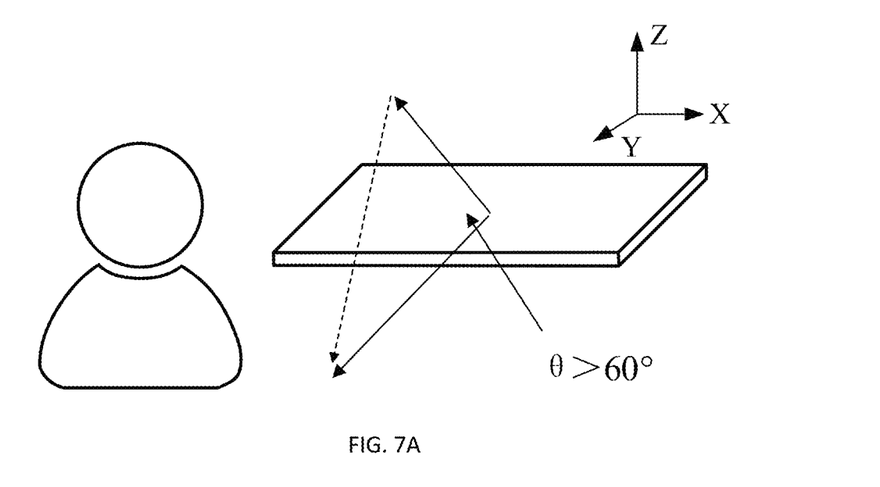
FIG. 7A is a schematic design diagram of an emitting azimuth angle θ of a sound source emitting a vibration sound.
Figure 7B:
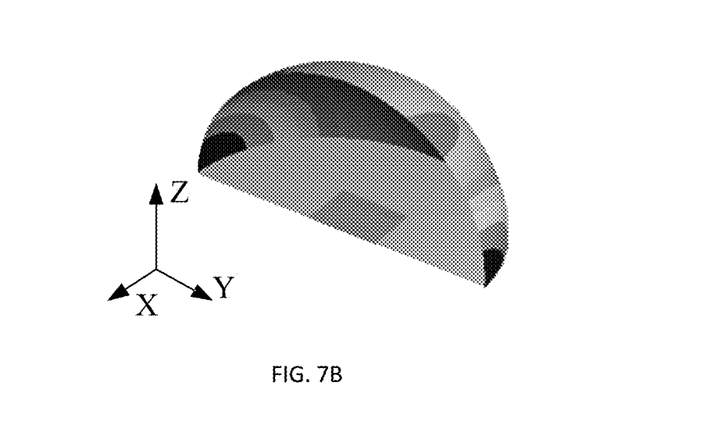
FIG. 7B is a section of a sound field distribution simulation for a y-z axis.
Figure 7C:
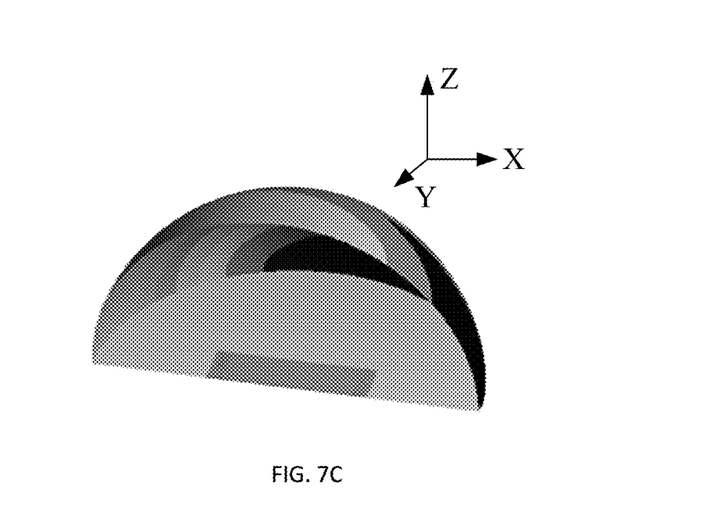
FIG. 7C is a section of a sound field distribution simulation for an x-z axis.

In a specific implementation, in the above haptic feedback panel according to embodiments of the present disclosure, in addition to the haptic feedback function, human-computer interaction also needs to have the screen sound characteristic. A relative position of a sound source with respect to the user is therefore very important. Generally, the touch substrate (touch screen) is located in front of the user during operation, so a direction of the sound source needs to face the user for the best effect. As shown in FIG. 7A, when the sound source emits a sound, the sound must be parallel to the sound source (Y axis), and an emitting azimuth angle of the sound source emitting a vibration sound is required to be greater than 60°. As shown in FIG. 7B and FIG. 7C, FIG. 7B and FIG. 7C are sections of sound field distribution simulations for a y-z axis and an x-z axis, respectively. The maximum sound pressure of the sound source is 0.04 Pa (corresponding to a driving voltage of 10 V), and when the driving voltage rises, a relationship between the sound pressure and the driving voltage is linear. In order to determine the direction of the sound source, the vibration of the touch screen needs to generate the vibration shown in FIG. 6A, to enhance the air density wave push along the y-axis during vibration, enhancing the user's experience.

Figure 8A:
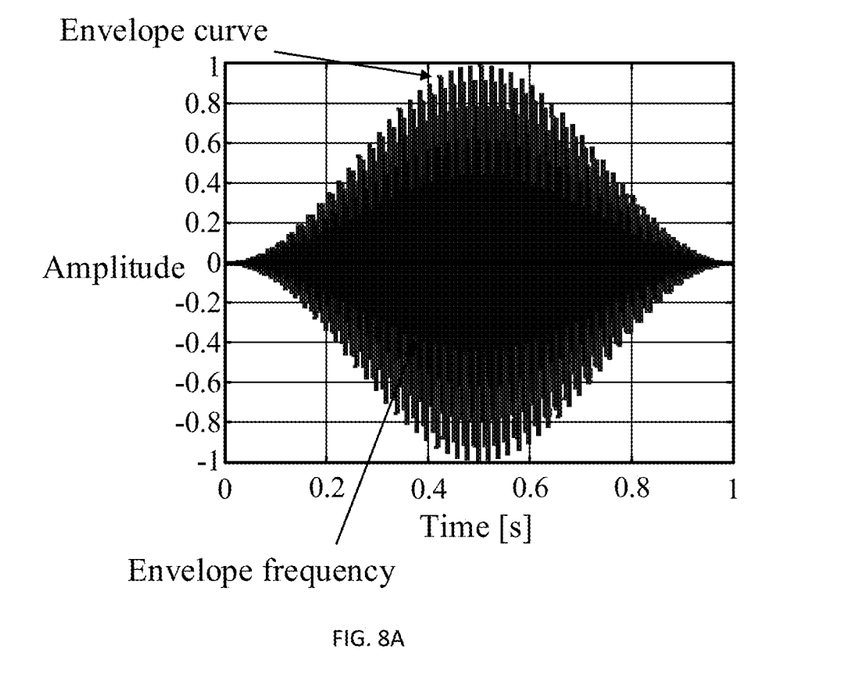
FIG. 8A is an audio and haptic hybrid driving waveform for driving a touch substrate to emit a vibration sound of a periodic vibration sense.
Figure 8B:
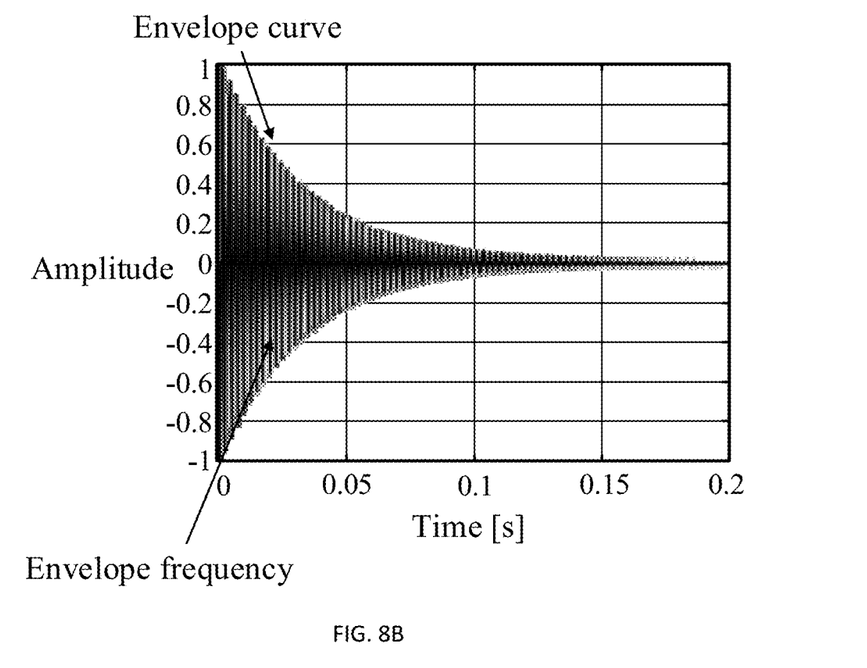
FIG. 8B is an audio and haptic hybrid driving waveform for driving a touch substrate to emit a vibration sound of a tapping vibration sense.

In a specific implementation, the vibration sound emitted by driving the touch substrate may include the vibration sound of a periodic vibration sense and a tapping vibration sense. As shown in FIG. 8A and FIG. 8B, FIG. 8A and FIG. 8B are audio and haptic hybrid driving waveforms, respectively. FIG. 8A is an audio and haptic hybrid driving waveform for driving a touch substrate to emit a vibration sound of a periodic vibration sense; FIG. 8B is an audio and haptic hybrid driving waveform for driving a touch substrate to emit a vibration sound of a tapping vibration sense.

In a specific implementation, in the above haptic feedback panel according to embodiments of the present disclosure, the audio and haptic hybrid driving waveform shown in FIG. 8A can drive the touch substrate to emit a vibration sound of a periodic vibration sense. The driving voltage input to the second electrode of the piezoelectric device corresponding to the audio and haptic hybrid driving waveform satisfies a following relationship:

$$Y = (\sin(2*\pi*0.5*t))*(0.5 - 0.5*\cos(2*\pi*fe*t))*\sin(2*\pi*fc*t);$$

hereinbefore, Y is the driving voltage, fc is a carrier frequency, fe is an envelope frequency, and t is vibration time.

In a specific implementation, in the above haptic feedback panel according to embodiments of the present disclosure, the audio and haptic hybrid driving waveform shown in FIG. 8B can drive the touch substrate to emit a vibration sound of a tapping vibration sense. The driving voltage input to the second electrode of the piezoelectric device corresponding to the audio and haptic hybrid driving waveform satisfies a following relationship:

$$Y = \exp(-1*\beta*t)*\sin(2*\pi*fc*t);$$

hereinbefore, Y is the driving voltage, B is an inverse attenuation coefficient, fc is a carrier frequency, and t is vibration time.

It should be noted that in the audio and haptic hybrid driving waveforms shown in FIG. 8A and FIG. 8B in embodiments of the present disclosure, a value of fc is 800 Hz, and a value of fe is 150 Hz.

Specifically, as shown in FIG. 1 and FIG. 4, a ground signal is applied to the first electrode 21 of the piezoelectric device 2, and the driving voltage Y for driving the touch substrate 1 to emit the vibration sound of a periodic vibration sense is applied to the second electrode 23 of the piezoelectric device 2. A driving voltage corresponding to an audio and haptic hybrid driving waveform is selected according to the requirement of the sense of vibration, to realize the haptic feedback and the screen sound simultaneously.

In a specific implementation, in the above haptic feedback panel according to embodiments of the present disclosure, as shown in FIG. 4, a thickness of the piezoelectric layer 22 may be 500 nm to 2000 nm. For example, the thickness of the piezoelectric layer 22 is 500 nm, 600 nm, 700 nm, 800 nm, 900 nm, 1000 nm, 1100 nm, 1200 nm, 1300 nm, 1400 nm, 15000 nm, 1600 nm, 1700 nm, 1800 nm, 1900 nm or 2000 nm.

In a specific implementation process, the first electrode and the second electrode can be made of indium tin oxide (ITO), and can also be made of indium zinc oxide (IZO). Of course, the first electrode and the second electrode can also be made of one of titanium gold (Ti—Au) alloy, titanium aluminum titanium (Ti—Al—Ti) alloy, or titanium molybdenum (Ti—Mo) alloy. In addition, the first electrode and the second electrode may also be made of one of titanium (Ti), gold (Au), silver (Ag), molybdenum (Mo), copper (Cu), tungsten (W) or chromium (Cr). Those skilled in the art may set the above electrode layers according to actual application requirements, which is not limited herein.

In a specific implementation, a material of the piezoelectric layer may be lead zirconate titanate (Pb(Zr,Ti)O$_3$, PZT), and may also be at least one of aluminum nitride (AlN), ZnO (zinc oxide), barium titanate (BaTiO$_3$), lead titanate (PbTiO$_3$), potassium niobate (KNbO$_3$), lithium niobate (LiNbO$_3$), lithium tantalate (LiTaO$_3$) or langasite (La$_3$Ga$_5$SiO$_{14}$). The material for manufacturing the piezoelectric layer may be selected according to actual use requirements of those skilled in the art, which is not limited herein. When the piezoelectric layer is made of PZT, since the piezoelectric characteristic of the corresponding piezoelectric sensor is ensured due to the high piezoelectric coefficient of the PZT, the corresponding piezoelectric sensor can be applied to a haptic feedback device. In addition, the PZT has higher light transmittance, when the PZT is integrated into a display device, the display quality of the display device is not affected.

The touch feedback panel according to embodiments of the present disclosure can be applied to fields of medical treatment, automotive electronics, motion tracking systems, etc., is particularly suitable for the field of wearable device, and is used for monitoring and treating the medical treatment in vitro or implanted into the human body, or applied to the electronic skin of artificial intelligence and other fields. In particular, the piezoelectric sensor can be applied to devices which can produce vibration and mechanical characteristics, for example, brake pads, keyboards, mobile terminals, game handles, vehicles and so on.

Based on the same inventive concept, an embodiment of the present disclosure further provides a haptic feedback method for driving the haptic feedback panel, including:

applying alternating electric fields with different resonant frequencies to the piezoelectric device, the piezoelectric device vibrates under action of the alternating electric fields, and drives the touch substrate to vibrate and emit a vibration sound.

The haptic feedback method for driving the haptic feedback panel according to embodiments of the present disclosure can realize integrated visual, tactile and auditory module design of virtual touch and screen sound. Virtual touch can be realize on the touch substrate and a corresponding sound prompt can be generated based on tactile perception, enhancing the authenticity and immersion of human-computer interaction.

In a specific implementation, in the above haptic feedback method according to embodiments of the present disclosure, a ground signal is applied to a first electrode of the piezoelectric device, a driving voltage for driving the touch substrate to emit the vibration sound of a periodic vibration sense is applied to a second electrode of the piezoelectric device, and the driving voltage satisfies a following relationship:

$$Y = (\sin(2*\pi*0.5*t))*(0.5 - 0.5*\cos(2*\pi*fe*t))*\sin(2*\pi*fc*t);$$

hereinbefore, Y is the driving voltage, fc is a carrier frequency, fe is an envelope frequency, and t is vibration time.

In a specific implementation, in the above haptic feedback method according to embodiments of the present disclosure, a ground signal is applied to a first electrode of the piezoelectric device, a driving voltage for driving the touch substrate to emit the vibration sound of a tapping vibration is applied to a second electrode of the piezoelectric device, and the driving voltage satisfies a following relationship:

$$Y = \exp(-1*\beta*t)*\sin(2*\pi*fc*t);$$

hereinbefore, Y is the driving voltage, B is an inverse attenuation coefficient, fc is a carrier frequency, and t is vibration time.

It should be noted that, the aforementioned haptic feedback method according to embodiments of the present disclosure may refer to the aforementioned haptic feedback principle in the above haptic feedback panel, which will not be repeated here.

Figure 9:
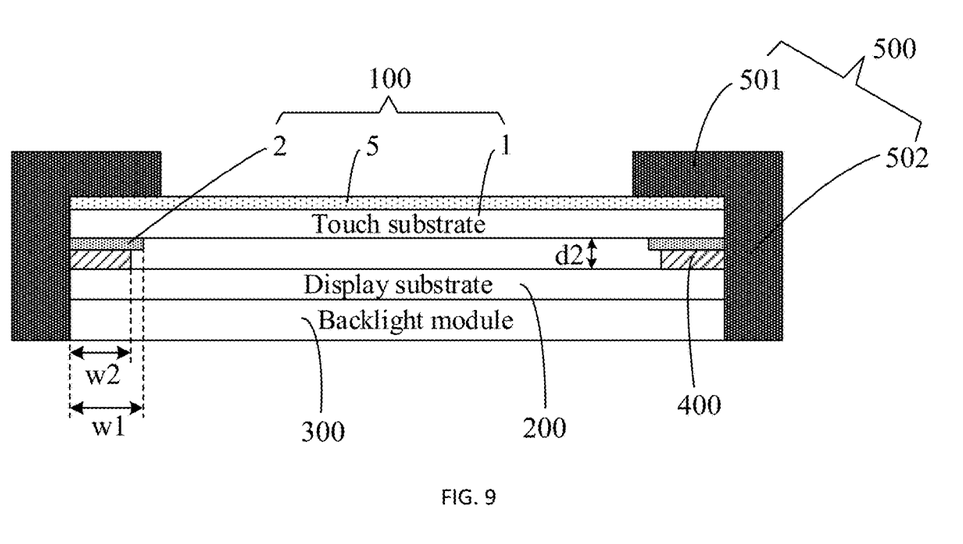
FIG. 9 is a schematic structural diagram of a haptic feedback device according to an embodiment of the present disclosure.

Based on the same inventive concept, an embodiment of the present disclosure further provides a haptic feedback device, as shown in FIG. 9, including the above haptic feedback panel 100 according to embodiments of the present disclosure, and a display substrate 200 on a side of the piezoelectric device 2 in the haptic feedback panel 100 away from the touch substrate 1. Since the principle of the haptic feedback device for solving the problem is similar to that of the aforementioned haptic feedback panel, implementations of the haptic feedback device can be referred to implementations of the haptic feedback panel, and the repetition is not repeated. The haptic feedback device can be any product or component that has a display or touch function, for example, a mobile phone, a tablet computer, a television, a display, a notebook computer, a digital photo frame, a navigator and the like.

In a specific implementation, the display substrate according to embodiments of the present disclosure may be a liquid crystal display (LCD) display substrate or an organic light emitting diode (OLED) display substrate.

Specifically, as shown in FIG. 9, taking the display substrate 200 being a liquid crystal display (LCD) substrate as an example, the haptic feedback device further includes a backlight module 300 on a side of the display substrate 200 away from the touch substrate 1.

In a specific implementation, in the above haptic feedback device according to embodiments of the present disclosure, as shown in FIG. 9, the display substrate 200 includes a display region AA and a peripheral region BB at a periphery of the display region AA. An orthographic projection of the piezoelectric device 2 on the display substrate 200 is located in the peripheral region BB, so that the piezoelectric device 2 does not affect display of the display substrate 200.

In a specific implementation, in the above haptic feedback device according to embodiments of the present disclosure, as shown in FIG. 9, a foam layer 400 between the piezoelectric device 2 and the display substrate 200 is further included. A width w2 of the foam layer 400 is less than a width w1 of the piezoelectric device 2, and the Young's modulus of the foam layer 400 is less than 0.1 GPa.

Specifically, as shown in FIG. 9, a gap d2 between the display substrate 200 and the touch substrate 1 is greater than 0.3 mm. The structure shown in FIG. 9 is a resonance cavity design that affects the deformation amount of the piezoelectric device 2 and the sound generation of the screen.

In a specific implementation, in the above haptic feedback device according to embodiments of the present disclosure, as shown in FIG. 9, a housing layer 500 for fixing the haptic feedback panel 100 and the display substrate 200 is further included. The housing layer 500 includes a first shielding part 501 fixed on a side of the haptic feedback panel 100 away from the display substrate 200, and a second shielding part 502 fixed on a side surface of the haptic feedback panel 100, a side surface of the display substrate 200, and a side surface of the backlight module 300. The first shielding part 501 and the second shielding part 502 are of an integral structure.

The orthographic projection of the piezoelectric device 2 on the display substrate 200 is located within a range of an orthographic projection of the first shielding part 501 on the display substrate 200, and an orthographic projection of the foam layer 400 on the display substrate 200 is located within a range of the orthographic projection of the piezoelectric device 2 on the display substrate 200.

The haptic feedback device according to embodiments of the present disclosure integrates the haptic feedback panel with the display substrate, and uses the piezoelectric device to realize the haptic feedback function and the sound emitting function of the haptic feedback panel. Then integrated visual, tactile and auditory module design of virtual touch and screen sound can be achieved using the screen display of the touch substrate. Virtual touch can be realize on the touch substrate and a corresponding sound prompt can be generated based on tactile perception, enhancing the authenticity and immersion of human-computer interaction.

In a specific implementation, the above haptic feedback device according to embodiments of the present disclosure may further include other film layers known to those skilled in the art, which are not described in detail here.

In a specific implementation, the position touched by the human body can be determined through the haptic feedback device, so as to generate a corresponding vibration waveform, amplitude and frequency and realize human-computer interaction. Of course, the haptic feedback device can also be applied to fields of medical treatment, automobile electronics, motion tracking systems and the like according to actual requirements, which will not be described in detail here.

Embodiments of the present disclosure provide a haptic feedback panel, a haptic feedback method therefor, and a haptic feedback device, which can use the piezoelectric device to realize the haptic feedback function and the sound emitting function of the haptic feedback panel. Then integrated visual, tactile and auditory module design of virtual touch and screen sound can be achieved using the screen display of the touch substrate. Virtual touch can be realize on the touch substrate and a corresponding sound prompt can be generated based on tactile perception, enhancing the authenticity and immersion of human-computer interaction.

Although embodiments of the present disclosure have been described, additional changes and modifications can be made to these embodiments by those skilled in the art once the basic inventive concept is appreciated. Therefore, it is intended that the appended claims be construed to cover embodiments and all changes and modifications which fall within the scope of the present disclosure.

Obviously, those skilled in the art can make various modifications and variations to embodiments of the present disclosure without departing from the spirit and scope of embodiments of the present disclosure. In this way, if these modifications and variations of embodiments of the present disclosure fall within the scope of the claims of the present disclosure and their equivalent technologies, the present disclosure also intends to include these modifications and variations.

What is claimed is:

1. A haptic feedback panel, comprising:
a touch substrate; and
at least one piezoelectric device on a side of the touch substrate, the piezoelectric device being configured to vibrate under action of alternating electric fields with different resonant frequencies, and drive the touch substrate to vibrate and emit a vibration sound;
wherein the piezoelectric device comprises a first electrode, a piezoelectric layer and a second electrode sequentially stacked; wherein the first electrode is close to the touch substrate, the first electrode is grounded, and the second electrode is electrically connected with an input end of a driving voltage;
the first electrode and the second electrode are configured to form the alternating electric fields, and the piezoelectric layer is configured to vibrate under the action of the alternating electric fields, and drive the touch substrate to vibrate and emit the vibration sound;
wherein:
the driving voltage for driving the touch substrate to emit the vibration sound of a periodic vibration sense satisfies a following relationship:

$$Y = (\sin(2*\pi*0.5*t))*(0.5 - 0.5*\cos(2*\pi*fe*t))*\sin(2*\pi*fc*t);$$

wherein Y is the driving voltage, fc is a carrier frequency, fe is an envelope frequency, and t is vibration time;
or
the driving voltage input by the input end of the driving voltage for driving the touch substrate to emit the vibration sound of a tapping vibration sense satisfies a following relationship:

$$Y = \exp(-1*\beta*t)*\sin(2*\pi*fc*t);$$

wherein Y is the driving voltage, B is an inverse attenuation coefficient, fc is a carrier frequency, and t is vibration time.

2. The haptic feedback panel according to claim 1, wherein fc is 500 Hz to 800 Hz.

3. The haptic feedback panel according to claim 1, wherein an emitting azimuth angle of a sound source emitting the vibration sound is greater than 60°.

4. The haptic feedback panel according to claim 1, wherein the at least one piezoelectric device comprises a plurality of piezoelectric devices, and a row of the piezoelectric devices are arranged on any two opposite sides of the touch substrate.

5. The haptic feedback panel according to claim 4, wherein the piezoelectric devices are arranged in series or in parallel.

6. The haptic feedback panel according to claim 1, wherein a gap between adjacent piezoelectric devices is less than 1 mm, and a thickness of the piezoelectric device is less than a thickness of the touch substrate.

7. The haptic feedback panel according to claim 1, further comprising an anti-explosion film layer on a side away from the piezoelectric device, of the touch substrate, wherein a transmittance of the anti-explosion film layer is greater than 90%.

8. The haptic feedback panel according to claim 1, wherein a thickness of the piezoelectric layer is 500 nm to 2000 nm.

9. The haptic feedback panel according to claim 1, wherein the piezoelectric layer comprises at least one of lead zirconate titanate, aluminum nitride, zinc oxide, barium titanate, lead titanate, potassium niobate, lithium niobate, lithium tantalate, or langasite.

10. A haptic feedback method for driving the haptic feedback panel according to claim 1, comprising:
applying alternating electric fields with different resonant frequencies to the piezoelectric device, wherein the piezoelectric device vibrates under action of the alternating electric fields, and drives the touch substrate to vibrate and emit a vibration sound.

11. The haptic feedback method according to claim 10, wherein a ground signal is applied to the first electrode of the piezoelectric device, the driving voltage for driving the touch substrate to emit the vibration sound of the periodic vibration sense is applied to the second electrode of the piezoelectric device.

12. The haptic feedback method according to claim 10, wherein a ground signal is applied to the first electrode of the piezoelectric device, the driving voltage for driving the touch substrate to emit the vibration sound of the tapping vibration sense is applied to the second electrode of the piezoelectric device.

13. A haptic feedback device, comprising: a haptic feedback panel and a display substrate; wherein:
the haptic feedback panel comprises:
a touch substrate; and
at least one piezoelectric device on a side of the touch substrate, the piezoelectric device being configured to vibrate under action of alternating electric fields with different resonant frequencies, and drive the touch substrate to vibrate and emit a vibration sound;

the display substrate is on a side away from the touch substrate, of the piezoelectric device in the haptic feedback panel, the display substrate comprises a display region and a peripheral region at a periphery of the display region, and an orthographic projection of the piezoelectric device on the display substrate is located in the peripheral region;

wherein the haptic feedback device further comprises a foam layer between the piezoelectric device and the display substrate, wherein a width of the foam layer is less than a width of the piezoelectric device.

14. The haptic feedback device according to claim 13, further comprising a housing layer for fixing the haptic feedback panel and the display substrate, wherein the housing layer comprises a first shielding part fixed on a side away from the display substrate, of the haptic feedback panel, and a second shielding part fixed on a side surface of the haptic feedback panel and a side surface of the display substrate; the first shielding part and the second shielding part are of an integral structure; wherein:

the orthographic projection of the piezoelectric device on the display substrate is located within a range of an orthographic projection of the first shielding part on the display substrate, and an orthographic projection of the foam layer on the display substrate is located within a range of the orthographic projection of the piezoelectric device on the display substrate.

* * * * *